(12) United States Patent
Bauer (10) Patent No.: US 6,929,062 B2
(45) Date of Patent: Aug. 16, 2005

(54) AIR-CONDITIONING APPARATUS

(76) Inventor: Albert Bauer, Hermann-Levi-Strasse 7, 80939 Munich (DE)

(*) Notice: Subject to any disclaimer, the term of this patent is extended or adjusted under 35 U.S.C. 154(b) by 256 days.

(21) Appl. No.: 10/273,068

(22) Filed: Oct. 17, 2002

(65) Prior Publication Data

US 2003/0042013 A1 Mar. 6, 2003

Related U.S. Application Data

(63) Continuation of application No. 08/998,507.

(30) Foreign Application Priority Data

Dec. 27, 1996 (DE) .......................... 196 54 542
Oct. 15, 1997 (DE) .......................... 196 54 955

(51) Int. Cl.$^7$ .............................. F24F 11/04; B01L 1/02
(52) U.S. Cl. ...................... 165/246; 165/217; 165/234; 165/243; 236/49.3; 454/187
(58) Field of Search .................. 165/217, 234, 165/243, 246; 454/238, 239, 255, 256, 340, 253, 187; 236/49.3

(56) References Cited

U.S. PATENT DOCUMENTS

| 4,257,318 A | * | 3/1981 | Johannsen | 454/229 |
|---|---|---|---|---|
| 4,347,712 A | * | 9/1982 | Benton et al. | 165/243 |
| 4,437,608 A | * | 3/1984 | Smith | 236/49.3 |
| 4,705,457 A | * | 11/1987 | Belusa | 236/49.3 |
| 4,781,107 A | * | 11/1988 | Nilsson | 454/238 |
| 5,761,908 A | * | 6/1998 | Oas et al. | 165/234 |
| 5,820,456 A | * | 10/1998 | Nelson | 454/52 |
| 5,884,500 A | * | 3/1999 | Wetzel | 454/233 |
| 6,095,426 A | * | 8/2000 | Ahmed et al. | 236/49.3 |

FOREIGN PATENT DOCUMENTS

| GB | 344914 | * | 3/1931 | ................. 454/238 |
|---|---|---|---|---|
| JP | 0092738 | * | 6/1983 | ................. 454/238 |

* cited by examiner

Primary Examiner—Teresa J. Walberg
(74) Attorney, Agent, or Firm—William J. Sapone; Coleman Sudol Sapone PC (57) ABSTRACT

An air-conditioning apparatus regulates at least the temperature of at least one room to a predetermined temperature desired value ($T_{RAUM\ SOLL}$) by ventilation with heated or cooled supply air. The air-conditioning apparatus has a supply air motor (15) which feeds the supply air through a supply air channel (10) to the room (1) to be air-conditioned, a cooling and/or heating device (30, 40 33) for the cooling or warming of the supply air, and an exhaust air motor (16) which draws the exhaust air from the room (1) to be air-conditioned through an exhaust air channel (11). The desired value ($P_{AB\ SOLL}$) for the regulator of the exhaust air motor (16) forms a room excess pressure established with respect to the outside pressure ($P_A$).

14 Claims, 8 Drawing Sheets

AIR-CONDITIONING APPARATUS

CROSS REFERENCE TO RELATED APPLICATION

This application is a continuation of application Ser. No. 08/998,507, now pending.

FIELD OF INVENTION

The invention relates to an air-conditioning apparatus which regulates the temperature in at least one room by ventilation with heated or cooled air to a predetermined desired temperature value.

BACKGROUND OF THE INVENTION

Air-conditioning apparatuses are used to create in the air-conditioned rooms comfortable conditions of occupation at any time of year, as they hold the temperature and humidity of the room air within fixed limits' and provide for a sufficient ventilation with fresh air.

In winter the supply air temperature is higher than the room air temperature when the air is also meant to warm the room, and in summer the supply air is injected at a lower temperature in order to hold the room at the desired cooled room air temperature.

Ordinarily, to achieve this, a conventional air-conditioning apparatus circulates too high an amount of air, the temperature of which has been adapted to the heating and cooling requirement. This is regarded as disadvantageous as a large volume of air is circulated even after the desired temperature has already been reached. Moreover, the danger exists that the supply air will be blown into the room through the supply air channel and will immediately leave the room to be air-conditioned through the exhaust air channel. There takes place very little mixing of the new supply air with the air present in the room.

Further, when air-conditioning several rooms, there is the problem that different desired temperatures are sought in the different rooms. An adaptation of the temperatures which takes into consideration the comfort in each room is possible only with difficulty.

SUMMARY OF THE INVENTION

Underlying the present invention is the problem of providing an air-conditioning apparatus which operates economically, ensures more comfortable room conditions and an optimal mixing of the room air with the supply air, in order to achieve a rapid adaptation to the desired heating, cooling, humidifying and dehumidifying values.

This problem is solved according to the invention by an air-conditioning apparatus which regulates the temperature in at least one room to a predetermined desired temperature value by ventilation with heated or cooled air. The apparatus is provided with a supply air motor which feeds the supply air through a supply air channel to the room to be air-conditioned, with a cooling and/or heating device introduced into the supply air channel for the cooling or warming of the supply air, and with an exhaust air motor which draws the exhaust air through an exhaust channel out of the room to be air-conditioned, in which the desired value for the regulator of the exhaust air motor builds up a room excess pressure established with respect to the outside pressure. Further advantageous embodiments of the invention form the objects of the subclaims.

Underlying the invention is the perception that the greater the excess pressure is in a room to be air-conditioned, the better is the ventilation by the supply air blown through the room. Therefore, the room warms up faster, the efficiency of the installation is improved and great temperature fluctuations in the room are avoidable for example, very warm at the top and very cool at the bottom, as are also temperature differences over the length and width of the room.

A good flow of air through the room ensures that in the shortest possible time and with a smaller amount of air, a room is heated, cooled, humidified or dehumidified. The smaller amount of supply air blown in is found pleasant. Because of the faster adaptation to the desired heating, cooling, humidifying and dehumidifying values, the efficiency of the air-conditioning apparatus is improved.

In particular, the desired value for the regulator of the exhaust air motor is determined in dependence on the outside temperature and/or on the supply air temperature and/or on the supply air pressure. This regulating of the exhaust air motor, in dependence on the outside temperature and/or on the supply air temperature and/or on the supply air pressure, is important for the optimization of the air flow. The higher the supply air temperature or the supply air pressure is, the greater the excess pressure would have to be for a favorable flow of air through the room to be air-conditioned with the supply air. The lower, however, the outside temperature is, the higher as a rule, therefore, the excess pressure in the room to be air-conditioned has to be. There must, therefore, be present a greater excess pressure for ensuring an optimal flow of air through the room with the blown-in supply air.

On the one hand, preferably the actual value for the regulator of the exhaust air motor is determined by a pressure difference between the channels, which is calculated from the difference between the absolute value of the pressure in the supply air channel and the absolute value of the pressure in the exhaust air channel. It will then be the case that, for example, excess pressure disturbances will occur in the air-conditioning apparatus in several rooms as a result of opening of windows in individual rooms, and therefore this results in an undesired rise in the excess pressure in the other rooms, taking place through the regulation of the exhaust air motor, by reason of the pressure loss in one room.

On the other-hand, preferably the actual value for the regulator of the exhaust air motor is formed by the room pressure difference which is calculated from the difference between the outside pressure and the room pressure.

Here above all, the room excess pressure varies exclusively over a predetermined temperature range of the outside temperature and/or of the supply air temperature, with a change in the outside temperature or of the supply air temperature, in which with an outside temperature below this temperature range, the room excess pressure has in each case a certain constant value, and, with an outside temperature or supply air temperature above this temperature range, the room excess pressure always has a further definite constant value. Above all, with rising outside temperature, in that temperature range, the room pressure falls from a maximum excess pressure to a minimal excess pressure.

Thereby account is taken of two opposite demands. On the one hand, for a good flow of air through the room to be air-conditioned, it is required that the excess pressure be as high as possible. On the other hand, the excess pressure must not be too great, because it is otherwise felt to be disagreeable, and with too great excess pressure, doors open themselves or no longer can be opened or are closed only with a high expenditure of force.

So that a comfortable regulation will be accomplished and an excess pressure will be ensured independently from the height or the floor level of the room to be air-conditioned, the room difference pressure is measured at a height or level over 0 (room height). Room height corresponds to outside elevation in respect to sea level.

According to one embodiment of the invention, the temperature of the supply air and the channel pressure of the supply air are coupled with one another in such a manner that both, in dependence on the value of the room temperature to the value of the supply air temperature and also in dependence on the value of the room temperature to the desired value of the room temperature, the channel pressure of the supply air is raised or lowered in the room, rooms or room zones.

The advantages herewith achieved lie especially in that a great volume of air-conditioned air is not unnecessarily circulated, but always only that volume is used that is required for a maximally rapid adaptation of the actual room values to the predetermined desired values.

In this manner not only are savings in energy achieved, but people in the room find it considerably more agreeable when a relatively strong air movement takes place only when the temperature of the blown-in air deviates from the actual temperature. With conventional air-conditioning apparatuses, in contrast, especially during the morning warming-up phase, even at a room temperature that lies far below the desired value, only slightly warmed supply air is blown into the rooms at a high channel pressure. This was hitherto felt to be disagreeable by the persons concerned, but it was regarded as unavoidable.

According to the present embodiment of the invention, heated air with the higher channel pressure is blown into the room only if the temperature of the supply air lies clearly above the predetermined desired temperature of the room and therewith, in the warming-up phase, lies far above the actual value of the room. By a relation regulation in which the channel pressure of the supply air is set in a fixed relation to the supply air temperature, a corresponding coupling of channel pressure of the supply air pressure to the supply air temperature can be realized especially advantageously.

Preferably the channel pressure of the supply air into the room, the rooms, or the room zones is adjusted over the range of the supply air motor.

For a selecting arrangement, a choice can be made between two delivery volume relations.

In the first place, for the heating case in which the desired value of the room temperature is less than the actual value of the room temperature, the channel pressure of the supply air is lowered with rising room temperature. Correspondingly, for the cooling case in which the desired value of the room temperature is greater than the actual value of the room temperature, the channel pressure of the supply air is lowered with falling room temperature. In the second place, for the heating case in which the desired value or the actual value of the room temperature is less than the supply air temperature and the actual value of the room temperature is less than the desired value of the room temperature, the channel pressure of the supply air is raised with rising supply air temperature. Correspondingly, for the cooling case in which the desired value or actual value of the room temperature is greater than the supply air temperature and the actual value of the room temperature is greater than the desired value of the room temperature, the channel pressure is raised with falling supply air temperature. The increase of the channel pressure of the supply air is found to be pleasant. Moreover, the efficiency of the heating and cooling apparatus is improved, as will be stated again-further below.

According to a further embodiment of the invention, the channel pressure of the supply air varies exclusively over a predetermined temperature range of the supply air temperature. If the supply air temperature presents a value below this temperature range, then the channel pressure of the supply air is allocated in each case to a certain constant magnitude. If the supply air temperature presents a value above the temperature range, then the channel pressure of the supply air is allocated in each case to a further determined constant magnitude.

In particular, with a supply air temperature higher with respect to the room temperature, the channel pressure rises over the predetermined temperature range of the channel pressure from its minimum performance up to its maximum performance with rising supply air temperature, and it correspondingly falls with falling supply air temperature.

Through the two regulating systems of the supply air channel pressure behavior, on the one hand, it is made possible for the efficiency of the air-conditioning apparatus to be improved. With higher channel pressure of the supply air, there is achieved also a more rapid and better flow through the room, and therewith a faster heating up of the rooms. On the other hand, for reasons of comfort, too great an air flow should be avoided, since this is felt to be disagreeable. The opposite demands are now optimally satisfied.

Here, the regulating circuit which regulates the channel pressure of the supply air is subordinated to the temperature regulating circuit; the desired supply channel pressure value being set in a fixed relation to the actual value of the supply air temperature. Herewith there is avoided any excessive increasing or decreasing in the temperature regulation. The room temperature swings back faster to the desired temperature value.

With air-conditioning for several rooms, the heated supply air is made available through a common supply air channel. In the case of different desired and actual temperatures of all the rooms, however, each room has a different heating requirement. In order to take this circumstance into account, according to a further form of execution of the invention, in the simultaneous air-conditioning of several rooms or room zones, the individual rooms or room zones are connected in each case through a supply air and an exhaust air line allocated to them from the central supply air and exhaust air channels, and in the individual supply air and/or exhaust air lines, throttle valves are arranged through which the channel pressure of the supply air is adjusted in the rooms or room zones.

Thereby undesired air movements are avoided in rooms, the actual and desired values of which are alike or approximately alike. Moreover it is achieved that, for example, in the case of a fully open fresh air control valve, an excessive amount of fresh air is not worked up.

The regulation of the control valves can occur additionally in dependence on supply air pressure or on the speed of the supply air motor.

In such an independent regulation of supply air temperature and individual room temperature, a situation can arise in which a single room has to be heated as rapidly as possible, but other rooms that already lie at their desired temperature are to be heated up as little as possible. When the supply air temperature rises, the individual regulation of these warm rooms will tend to close the control valves.

Therewith, however, these rooms and the persons present in them are cut off from the fresh air supply.

This problem is advantageously solved according to a further embodiment, in which at a supply air temperature that lies above the desired temperature, in rooms the actual temperature of which corresponds to the desired temperature, the requisite minimum volume of fresh air also is blown. In this manner it is achieved that these rooms are supplied with sufficient fresh air; nevertheless, a possible warming of the rooms by reason of a supply air temperature that lies above the desired temperature is avoided insofar as possible. The minimum opening required for the prescribed minimum fresh air volume depends on the supply air temperature and on the fresh air component of the supply air, for the fresh air component of the supply air is reduced, if possible, during the warming-up phase in the morning for a maximally rapid heating up, being replaced by return air.

According to one embodiment, the exhaust air channel and the supply air channel are connected with one another through a return air channel, in which case at least one air exhaust throttle control valve is provided in the return air channel, and at least one fresh air throttle control valve is provided in the fresh air channel engaged ahead of the supply air channel.

According to a further embodiment, the minimum cross section of the throttle control valves is adjusted in dependence on the opening of the fresh air throttle control valve, of the exhaust air throttle control valve and of the mixing air throttle control valve, so that in each regulation situation there is ensured the minimum amount of fresh air.

With regulated channel pressure for the supply air and for the exhaust air, the opening positions of the throttle control valves allocated relative to one another in a room or in a room zone are equal.

Analogously to the heating regulation, there can also take place a cooling regulation.

For the temperature regulation, regulators are used. In practice, these regulators tend to an overswinging and underswinging of the regulating value.

According to a further embodiment of the invention, in each case the setting value of at least one regulator, especially of the temperature regulator, is connected to a subordinated switching arrangement, and the switching arrangement, in the case of an overswinging (exceeding) of the regulating value, selects a value predetermined for it, as the setting value, which clearly lies under the value chosen simultaneously by the regulator.

Such a behavior can advantageously be obtained by an additional control arrangement and a minimum-selection arrangement. This additional control arrangement delivers, in dependence on the regulating difference, a predetermined minimal value for the setting magnitude when an overswinging of the regulating value occurs, and a predetermined maximal value of the setting value when the actual value of the temperature (the regulating value) lies below the desired value. The minimum selection arrangement then in each case selects the minimum, from the values made available by the regulator and the additional control arrangement and forwards the selected value as the setting value. In this manner the additional control arrangements always take over the control of the setting value when by reason of the setting value of the regulator, an overswinging (exceeding) occurs in the regulating value.

According to a further embodiment of the invention, there are provided a fresh air control valve in a fresh air channel engaged on an inlet side of the supply air channel, a mixed air control valve in a return air channel connecting the supply air channel with the exhaust air channel, and a discharge air control valve in a discharge air channel connecting to the exhaust air channel, in which situation the settings of the fresh air control valve, of the discharge air control valve and of the mixed air control valve are regulated in common dependence on the speed of the supply air motor or on the channel pressure of the supply air, and in which up to a certain minimal opening for ensuring a fresh air minimum, with increasing speed of the supple air motor and/or with rising channel pressure of the supply air, the opening cross sections of the fresh air control valve and of the discharge air control valve can be reduced and the opening cross section of the mixed air control valve can be increased.

The opening position of the fresh air control valve and the opening position of the exhaust air control valve are always of equal size. The opening position of the mixed air control valve is always the difference of the opening position of the fresh air or exhaust air control valve to 100%, for example, if the opening positions of the fresh air control valve and exhaust air throttle control valve are each case 70%, then the opening position of the mixed air control valve is 30%. If the mixed air control valve has an opening position of 70%, then the opening positions of the fresh air and exhaust air control valves are in each case 30%.

In a further preferred embodiment of the invention, more than one room is air-conditioned from a central installation. In the case of different heating requirements for the individual rooms, it is also necessary to make available through the supply air a sufficient heating capacity for all the rooms. This can be achieved inter alia by the means that the heating required is measured in accordance to the actual temperature of the coldest room, in order to bring also this room to the desired temperature in a short time. Accordingly, in one form of execution of the invention, in the simultaneous air-conditioning of several rooms, the actual temperature of each room is fed to a central regulating arrangement, and a temperature value to be determined individually from these individual actual values, is supplied as an actual value for the heating regulator.

According to a further embodiment of the invention, a humidifying arrangement is provided which humidifies the supply air in the supply air channel, in which process the humidifying arrangement is regulated both in dependence on the room moisture or the exhaust air moisture as well in dependence on the supply air temperature.

According to a further embodiment of the invention, there are provided a first heating device installed in the supply air channel, a cooling device located after the first heating device in the supply air channel, and a second heating device installed after the cooling device in the supply air channel for the heating, cooling and dehumidifying of the supply air, the second heating device being regulated for the desired moisture value in dependence on the actual moisture value.

In particular with a rising actual humidity value which already lies above the desired humidity value, the heating performance of the second heating device rises.

The heating performance of the second heating device is regulated either with a regulator or it climbs with rising actual moisture value over a predetermined moisture range of the room moisture; at a room moisture content below this moisture range, the heating performance has in each case a certain constant magnitude and at a room moisture above the moisture range, the heating performance has in each case a further determined constant magnitude.

It is hereby achieved that a dehumidifying is brought about over a rising room temperature insofar as the actual value of the room temperature remains under the limit value from which the cooling process is initiated. Cooling starts only when the actual value of the room temperature is greater than the desired value of the room temperature plus the temperature displacement dependent on the outside temperature. By the heating-up, and therewith, the dehumidifying of the room over the rising temperature, the room is rapidly dehumidified with a relatively low expenditure of energy.

The channel pressure of the supply air is not raised during the dehumidifying process.

In order to guarantee a minimum amount of fresh air in the room or the rooms, the regulation of the fresh air control valve and of the discharge air control valve occurs in dependence on the opening position of the mixed air control valve.

BRIEF DESCRIPTION OF THE DRAWINGS

The following drawings, which are included to provide further understanding of the present invention and are incorporated in and constitute a part of this specification, illustrate the preferred embodiments of the invention and together with the description serve to explain the principles of the invention.

In the simplest case, a single room is tempered and ventilated with the air-conditioning apparatus. The regulation of a multi-room air-conditioning is described in the example of execution with the aid of the drawings, in which:

FIG. 8b is a block circuit diagram with the most important elements from FIG. 8a.

DETAILED DESCRIPTION OF PREFERRED EMBODIMENTS

Figure 1:
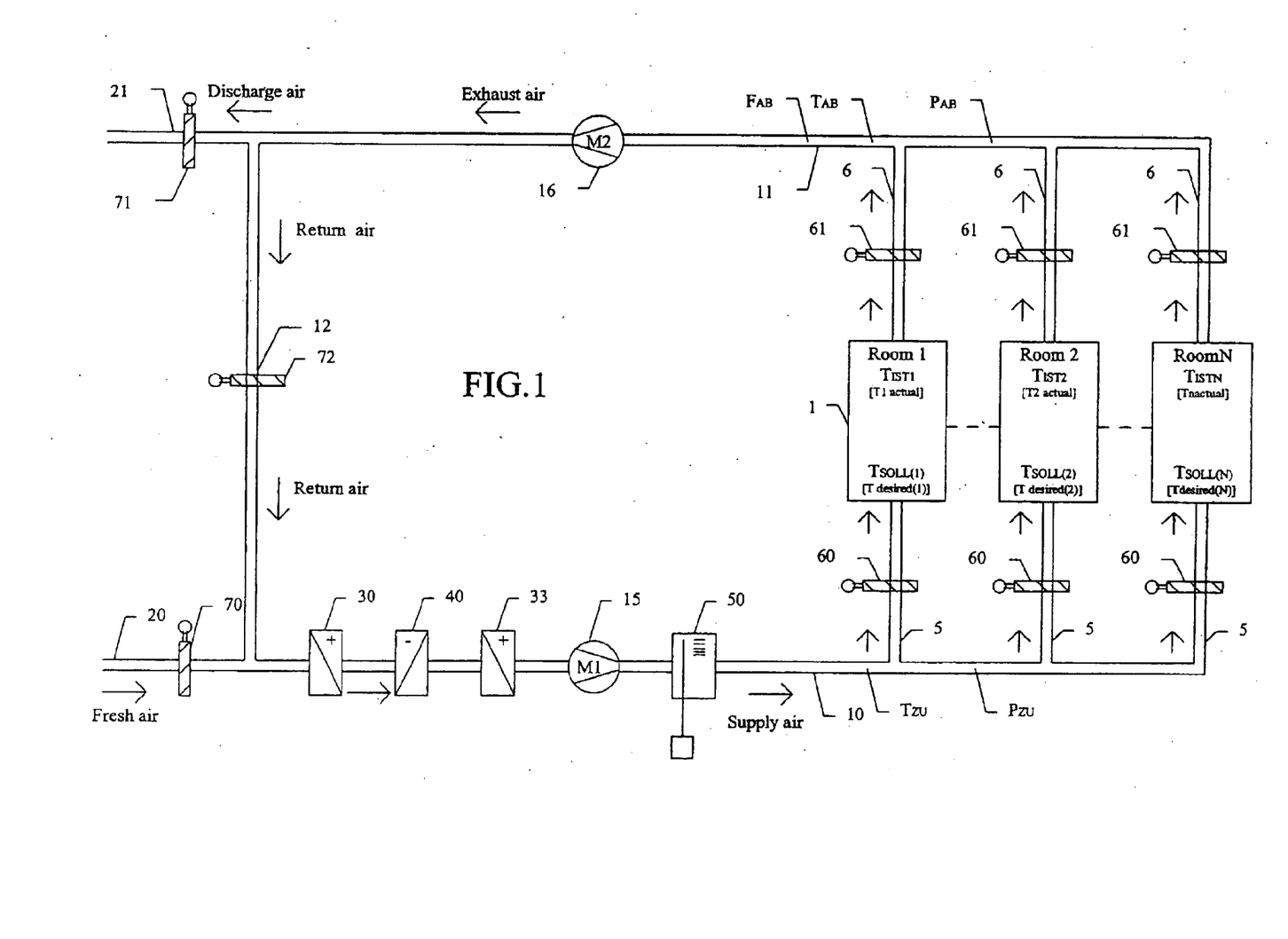
FIG. 1 shows a schematic representation of the air circulation in an air-conditioning apparatus according to the invention.

In FIG. 1 there is schematically represented the air circulation of a multi-room air-conditioning system. From the rooms 1 to be air-conditioned there lead, on the one hand, supply air lines 5 to a supply air channel 10 and, on the other hand, exhaust air lines 6 to an exhaust air channel 11.

In the supply air line 5 there is arranged in each case a throttle control valve 60 and in the exhaust air line 6 in each case a throttle control valve 61.

The supply air channel 10 and the exhaust air channel 11 are connected with one another through a return air channel 12.

On inlet side of the supply air channel 10 there is engaged a fresh air channel 20 and on the outlet side of the exhaust air channel 11 there is engaged an exhaust air channel 21.

In the fresh air channel 20 there is provided a fresh air throttle control valve 70, in the return air channel 12 a mixed air throttle control valve 72 and in the exhaust air channel 21 an exhaust air throttle control valve 71.

In the supply air channel 10 there are arranged successively in flow direction of the air a first heating device 30, a cooling device 40, a second heating device 33, a supply air motor 15 and a humidifying device 50.

In the supply air channel there is generated by the supply air motor 15 an air pressure $P_{ZU}$ which provides that the supply air is blown with sufficient conveyance volume into the rooms 1 to be air-conditioned.

Correspondingly in the exhaust air channel 11 there is generated by the exhaust air motor 16 a subpressure $P_{AB}$, which draws off the room air.

In the simplest case, the pure airing case (office operation), the drawn off room air(i.e. the exhaust air) is taken off through the exhaust air channel 11 and the exhaust air channel 21 to the outer atmosphere, and through the fresh air channel 20, the required supply air is drawn as fresh air into the supply air channel 10. For this, the fresh air throttle control valve 70 and the exhaust air throttle control valve 71 are opened and the mixed air throttle control valve 72 is closed. The fresh air throttle control valve 70 and the exhaust air throttle control valve 71, always have equal opening settings.

In order to make possible a warming-up of the air-conditioned rooms 1, the drawn-in fresh air flows through the first heating device 30 (preheater) through which drawn-in air is brought according to a heating requirement to the requisite supply air temperature $T_{ZU}$. After passing the disengaged cooling device 40 and the second heating device 33 (afterheater), it is fed to the humidifying device 50, which supplies the necessary moisture to the air.

Instead of the first heating device 30, in a required cooling of the rooms to be air conditioned, the cooling device 40 is in operation. In the case of excessive humidity, instead of the humidifying device 50, the afterheater 33 is in operation for the dehumidifying. In order to ensure a more rapid heating-up, both the first heating device 30 and also the second heating device 33 can be in operation. This, however is possible for the heating case, not for the dehumidifying case.

The air worked-up in this way is fed to the individual rooms to be air-conditioned, through the supply air motor 15, the supply air channel 10 and the supply air lines 5, with the throttle control valves 60. The volume of the air blown-in and drawn off from each individual room can be regulated by the throttle control valves 60, 61 arranged in the supply air lines 5 and in the exhaust air lines 6 individually.

In the case of increased heat requirement, for example in the morning warm-up phase, it is advantageous to supply the rooms not only with drawn-in fresh air, but to use a part of the drawn-off room air repeatedly, for in the simultaneous warming-up and ventilation the required supply air volume lies far above the fresh air minimum volume. For this reason, in dependence on the supply air temperature $T_{ZU}$ through a control arrangement (controller) 500 in FIG. 2, a setting value $Y_v$ is calculated and supplied to the air throttle control valves 550 in FIG. 2, or 70, 71, 72 in FIG. 1.

While the fresh air throttle control valve 70 and the exhaust air throttle control valve 71 receive the same control signal, the mixed air throttle control valve 72 in the return air channel 12, is supplied the exactly opposite control signal. The open position of the mixed air throttle control valve 72 is always the difference between the open position of the fresh air control valve 70 or of the exhaust air control valve 71 and 100%. For example, the open position of the fresh air control valve 70 and of the exhaust air control valve 71 amounts in each case to 70%, then the open position of the mixed air control valve 30 amounts to 30%. If the mixed air control valve has an open position of 70%, then the open position of the fresh air control valve 70 and of the exhaust air control valve 71 is in each case 30%.

In this manner it is possible again to feed a certain proportion of the drawn-off room air through the return air channel 12 to the supply air. Simultaneously through the fresh air channel 20 and the fresh air control valve 70, a corresponding fresh air component is supplied to the supply air. This fresh air component amounts in the example of execution in the airing case (during the office hours) to up to 100%. During office hours, therefore, the mixed air control valve 72 as a rule is not opened, and the fresh air control valve 70 and the exhaust air control valve 71 are normally opened to 100% each. With increased heating requirement and a maximal supply air pressure $P_{ZU\ MAX}$ the fresh air component falls to approximately 10%-warming-up phase in the morning.

Figure 2:
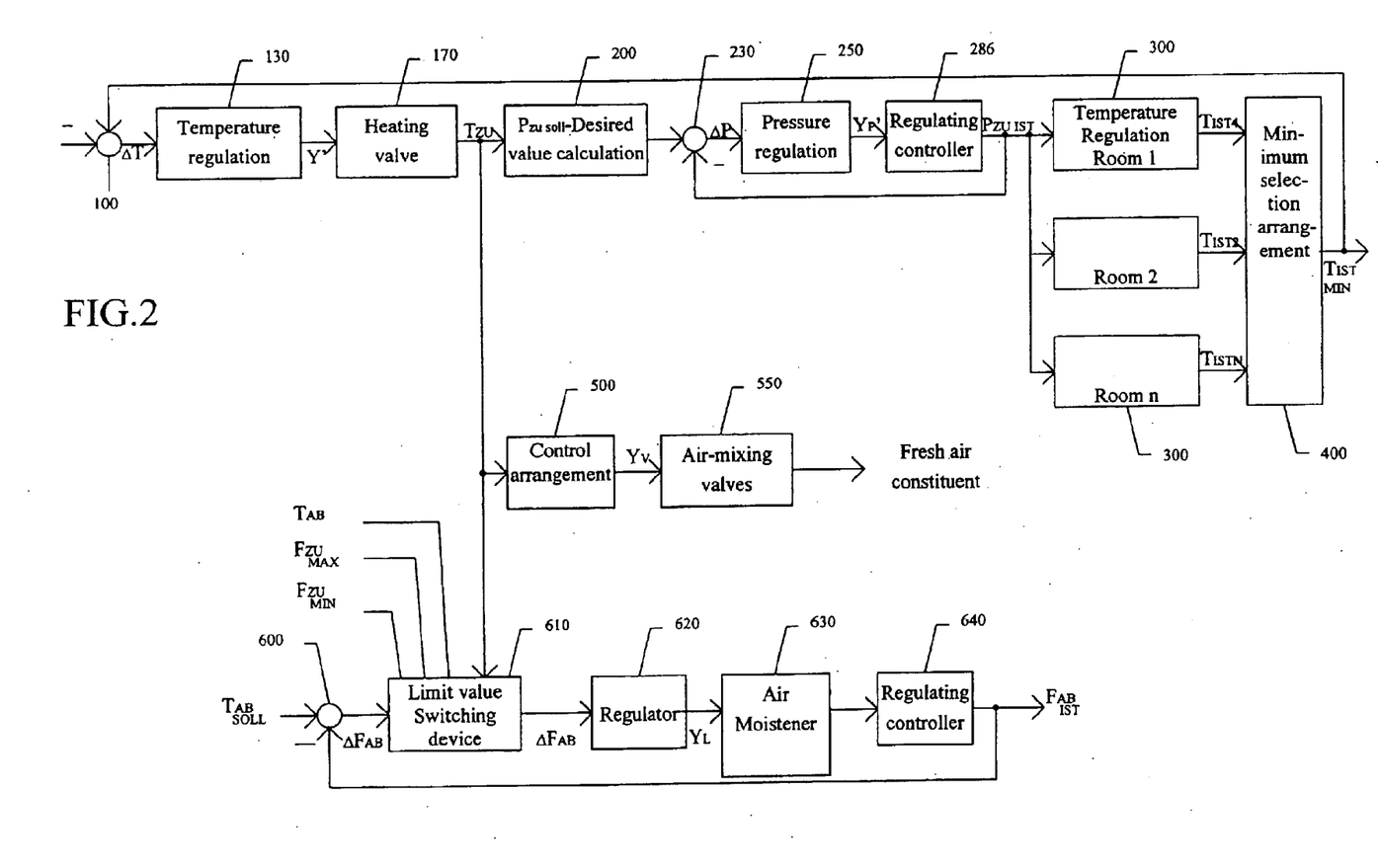
FIG. 2 is a block circuit diagram with the most important elements of the regulating and control arrangements in an example of execution.

In the air-conditioning, from the measured room temperatures $T_{RAUM\ IST1}$, $T_{RAUM\ IST2}$ or $T_{RAUM\ IST\ N}$ in the minimal selection controller 400 in FIG. 2, the lowest value $T_{RAUM\ IST\ MIN}$ is determined and used for the calculation of the heating requirement. For this, the actual temperature $T_{RAUM\ IST\ MIN}$ in the block circuit diagram element 100 is subtracted from the predetermined (maximal) desired temperature $T_{RAUM\ SOLL}$ (of all the rooms). On the basis of the temperature difference T (regulating difference), by the temperature regulation system 130, there is determined a suitable desired value y' for the heating valve 170 of the heating device 30 in FIG. 1.

Figure 3:
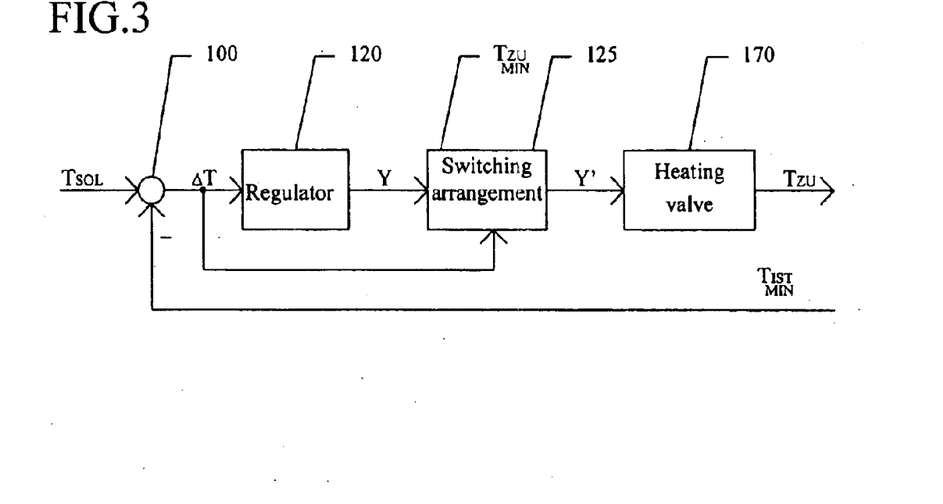
FIG. 3 is a block circuit diagram with important elements of the temperature regulating circuit from FIG. 2.

The setting value Yr calculated in FIG. 3 for the temperature regulation is monitored by the switching controller 125 arranged on an outlet side in order largely to prevent an overswinging of the temperature usual with conventional regulators. In the normal case, as long as $T_{RAUM\ IS\ MIN}$ lies below $T_{RAUM\ SOLL}$, the switching controller 125 forwards the setting value $Y_R$ unaltered as y' onward to the heating valve 170. If, however, $T_{RAUM\ IST\ MIN}$ exceeds the desired temperature $T_{RAUM\ SOLL}$ then, instead of $Y_R$ a much smaller setting value y' will be forwarded on to the heating valve 170. The value of the setting magnitude y' assures in this case the minimally required supply air temperature $T_{ZU\ MIN}$, which is dependent on the outside temperature $T_A$. In this manner with the example of execution, there is achieved a maximal overswinging of the desired temperature by only 0.3° C.; a falling below this virtually does not take place.

Figure 7:
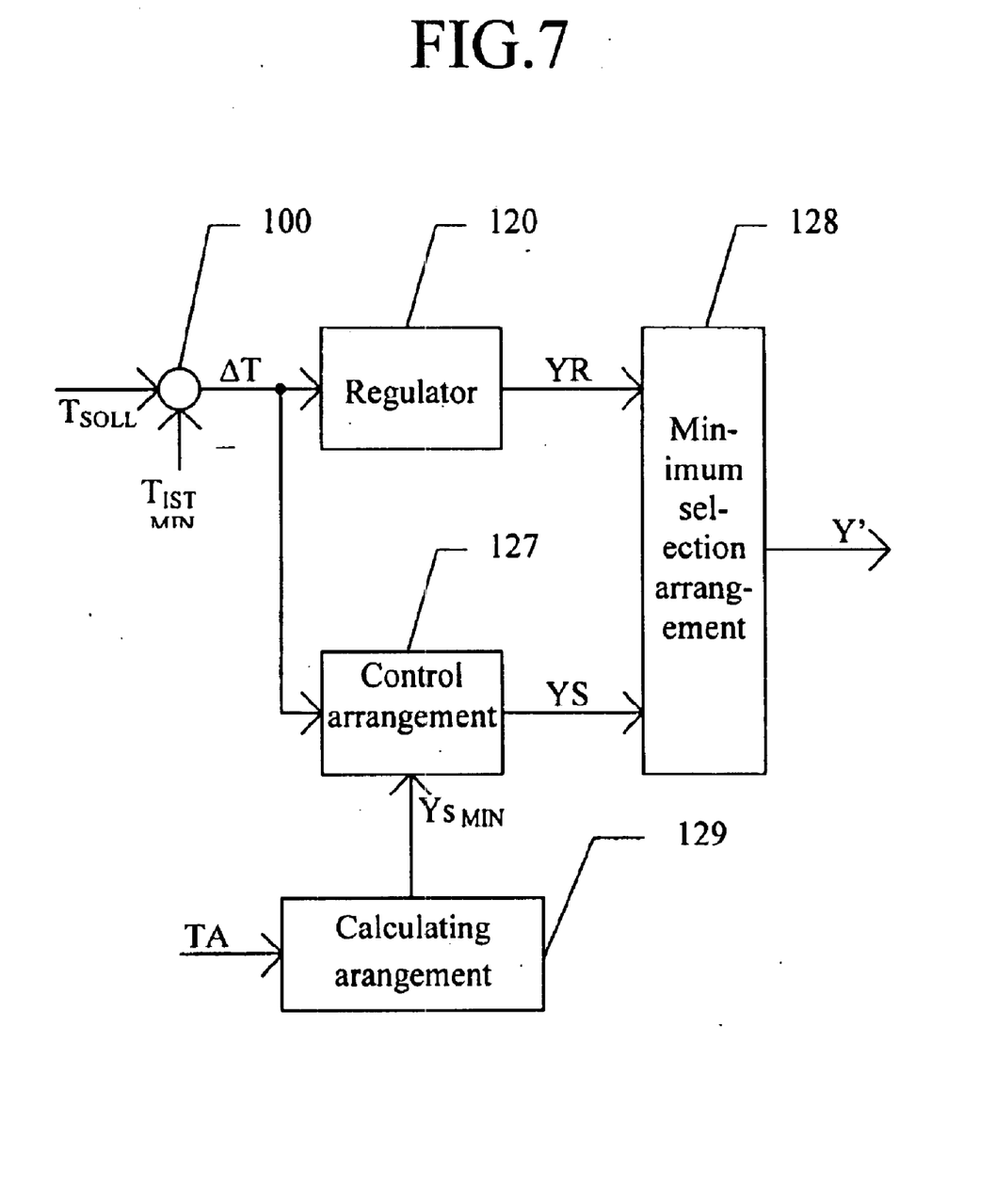
FIG. 7 is a block circuit diagram of the temperature regulator of the example of execution.

The monitoring of the setting signal $Y_R$ of the regulator 120 is executed in the example of execution by a switching controller 127 in FIG. 7 and a minimum selection controller 128. The control arrangement simultaneously generates, for the regulator 120, a setting signal $Y_S$ which takes on a maximally great value as long as the desired temperature $T_{RAUM\ SOLL}$ lies above the actual temperature $T_{RAUM\ IST}$ and moves down to the very low setting $Y_{S\ MIN}$ as soon as the actual temperature exceeds the desired value.

The setting value $Y_{S\ MIN}$ of the controller 128 is adjusted by the computing system 129 for the cutting-off of the otherwise occurring underswinging of the temperature regulation in dependence on the outside temperature $T_A$ with which the fresh air is drawn in.

The minimum selection controller 128 in each case selects, from the two setting value signals $Y_R$ and $Y_S$ at its disposal, the smaller one and forwards this onward as y' to the heating valve 170. In this manner there is prevented, insofar as possible, an overswinging of the temperature to be regulated.

In dependence on the temperature of the supply air, the conveyance of the supply air motor 15 is adjusted over the generated supply air pressure $P_{ZU}$. For this first of all, in a $P_{ZU\ SOLL}$ value calculating controller 200 shown in FIG. 2, there is determined a desired value $P_{ZU\ SOLL}$ for the supply air pressure. The relation between the supply air temperature $T_{ZU}$ and the supply air pressure $P_{ZU\ SOLL}$ is given in FIG. 6a, for the case in which the room temperature $T_{RAUM\ IST}$ is less than the desired value of the room temperature $T_{RAUM\ SOLL}$.

Figure 6A:
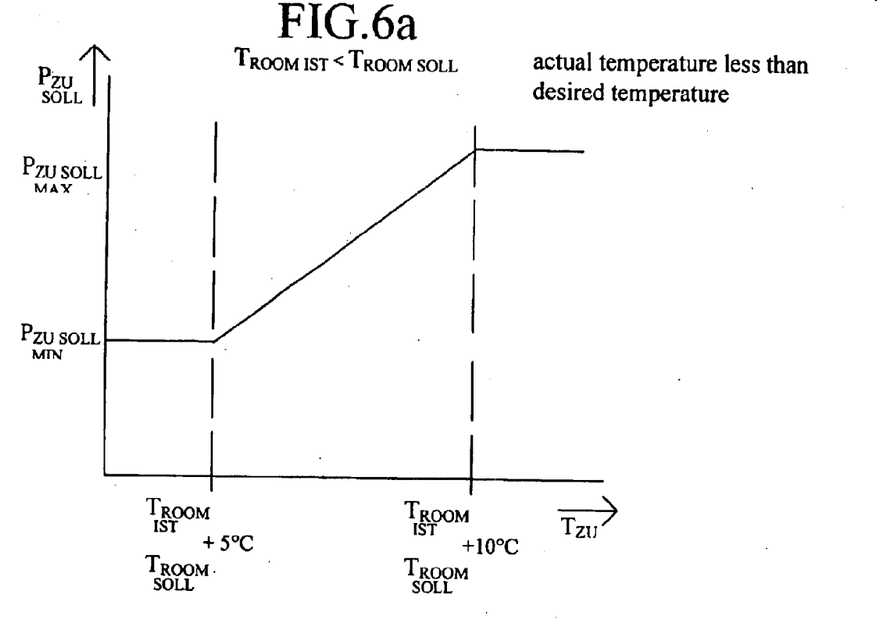
FIG. 6a shows the relation between the supply air temperature and the supply air pressure for the example of execution when the room actual temperature is less than the desired room temperature value.

Only when the supply air temperature lies clearly above the desired temperature value, in the example of execution by 5° C., is the desired pressure of the supply air increased. When this supply air temperature is below this threshold, only the volume of air necessary for the ventilation of the rooms is blown into the air-conditioned rooms.

Figure 6B:
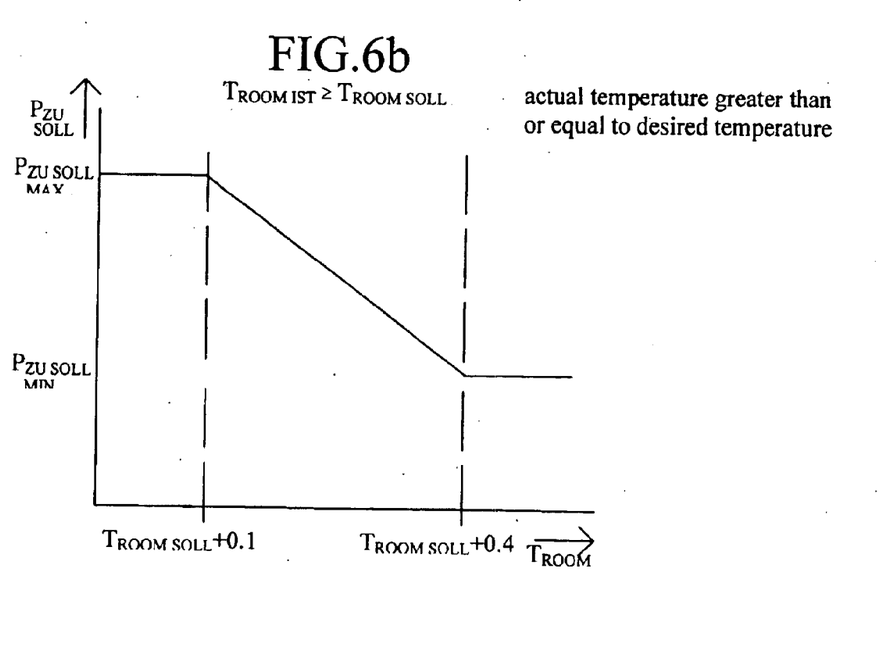
FIG. 6b shows the relation between the room temperature and the supply air pressure for the example of execution when the actual room temperature is greater than or equal to the desired room temperature value.

The relation between the room temperature $T_{RAUM\ IST}$ and the desired value of the supply air pressure $P_{ZU\ SOLL}$ is represented in FIG. 6b, for the case in which the room temperature $T_{RAUM\ IST}$ is greater than the desired value of the room temperature $T_{RAUM\ SOLL}$, or is equal to the desired value for the supply air temperature $T_{RAUM\ SOLL}$.

With increasing actual room temperature $T_{RAUM\ IST}$, when the room temperature is higher than the desired room temperature value $T_{RAUM\ SOLL}$, the air supply temperature $T_{ZU}$ falls and the supply air pressure $P_{ZU}$ falls from its maximal pressure $P_{ZU\ SOLL\ MAX}$ to its minimal pressure $P_{ZU\ SOLL\ MIN}$.

The desired supply air pressure $P_{ZU\ SOLL}$ determined by the $P_{ZU\ SOLL}$ value calculating controller 200 in FIG. 2 is compared in the block circuit diagram element 230 with supply air actual pressure $P_{ZU\ IST}$. The pressure difference P is supplied to the pressure regulator 250.

Figure 4:
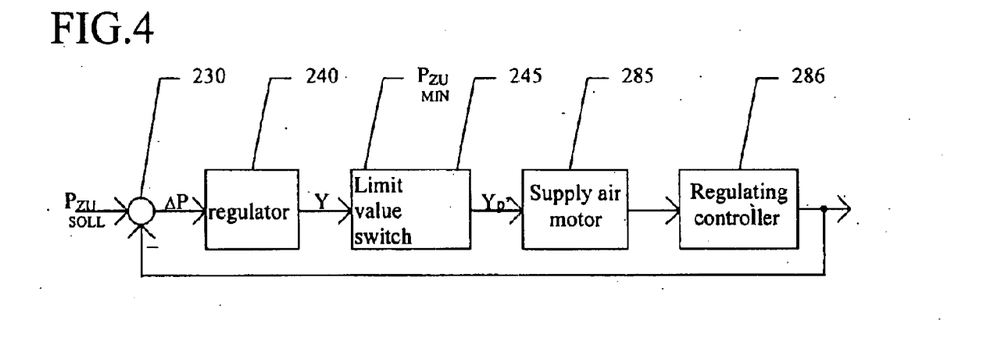
FIG. 4 is a block circuit diagram of a conveyance volume regulating circuit of the supply air from FIG. 2.

The complete pressure regulating circuit is represented in FIG. 4. The regulating difference ΔP is fed to the regulator 240, which sets-in the setting value $Y_P$. A limit value switch 245 monitors the setting value $Y_P$, so that a predetermined minimum pressure $P_{ZU\ MIN}$ which corresponds to a predetermined minimum ventilation volume is not gone below. The setting value $Y_P$ of the limit value switch 245 controls the air supply motor 285 in FIG. 4 or 15 in FIG. 1, which generates the pressure of the process regulating controller 286.

With the corresponding regulating circuit by an exhaust air motor 16 in the exhaust air channel 11, a subpressure $P_{AB}$ is generated which, for the maintaining of a predetermined excess pressure in the rooms, draws off a corresponding volume of air. The regulation of the exhaust air motor 16 will still be further described below.

Figure 5:
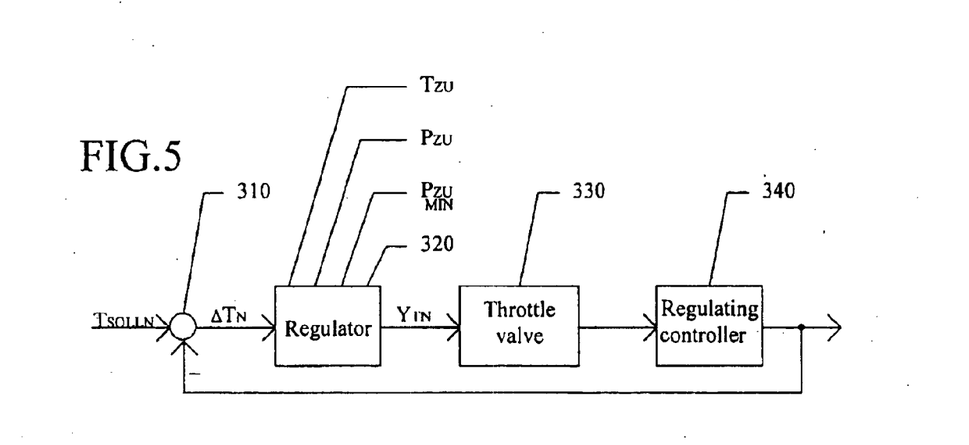
FIG. 5 is a block circuit diagram of an individual temperature regulating circuit for each room from FIG. 2.

The tempered supply air in the supply air channel 10 is available through the supply air lines 5 for the ventilating and heating-up of all the rooms 1. With the aid of the throttle valves 60, 61, the volume of the air blown in or drawn off in each room is adapted to the particular actual heating requirement. For this in each case there are used the desired temperature, the actual temperature, the supply air temperature and the minimum ventilation volume for the setting of the throttle valves. This regulating circuit, represented in FIG. 2 as a block circuit forming element 300, is reproduced in FIG. 5.

In the block circuit element 310, the individual desired temperature $T_{SOL\ N}$ is compared with the corresponding actual temperature $T_{IST\ N}$; the regulating difference TN ascertained there is supplied to the regulator 320. On the basis of the temperature difference, $\Delta T_N$, of the supply air temperature $T_{ZU}$ and of the supply air pressure $P_{ZU}$, this generates a setting signal $Y_T$ which must not fall below a minimal value which is yielded from the actual supply air pressure $P_{ZU}$ and from the minimal pressure $P_{ZU\ MIN}$. The setting signal $Y_{TN}$ is fed to the throttle control valves 330 in FIG. 5, and 60, 61 in FIG. 1. The regulating controller of this individual temperature regulating circuit is represented by the block circuit element 340.

The throttle valves 60, 61 are regulated, therefore, in dependence on the desired temperature value $T_{RAUM\ SOLL}$ in each room individually, on the actual temperature value $T_{RAUM\ IST}$ measured in each individual room, of the temperature value of the supply air temperature $T_{ZU}$, as well as in dependence on the supply air pressure $P_{ZU}$ and/or the speed of the supply air motor.

As stated above, the regulating circuit ensures, for the adjustment of the opening cross section of the throttle valves 60, 61, a certain minimum opening cross section yielded in dependence on the supply air pressure, which cross section is not gone below in the adjustment of the throttle valves 60, 61. This minimum opening cross section is adjusted there in such manner that each room receives a predetermined absolute minimum fresh air volume.

The minimum opening cross section of the throttle valves 60, 61 is likewise adjusted in dependence on the opening of the fresh air valve 70, of the exhaust air valve 71 and of the mixed air valve 72.

With regulated conveyance volume of the supply air and of the exhaust air, the opening settings of the throttle valves 60, 61 allocated to one another in a room 1 are equal.

Figure 8A:
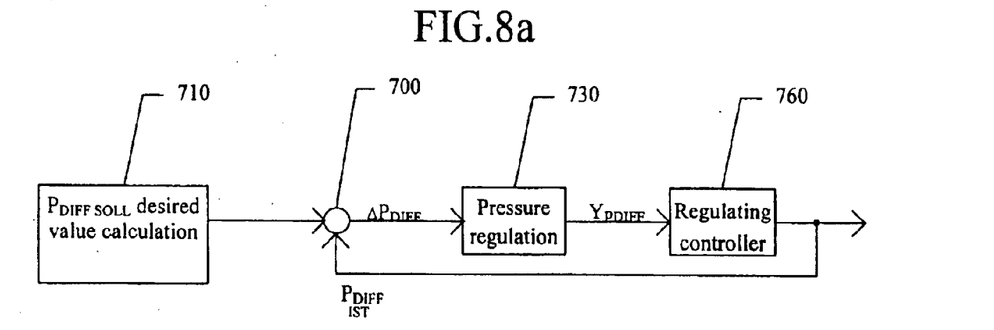
FIG. 8a is a block circuit diagram of the regulator of the exhaust air motor of the example of execution.
Figure 8B:
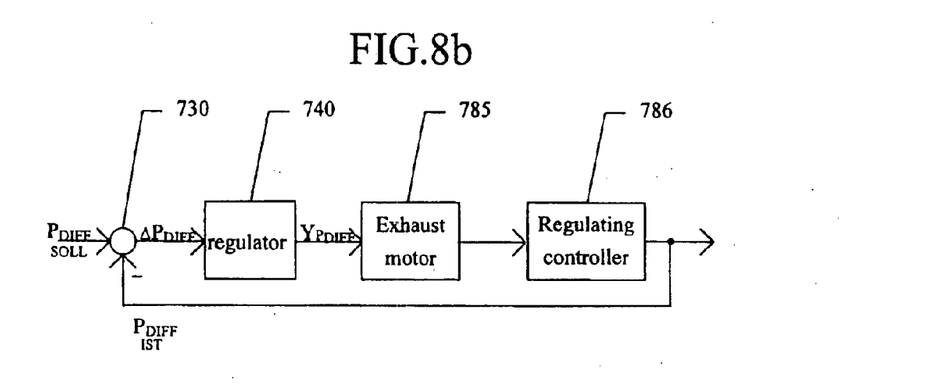

In the regulating of the exhaust air motor 785 according to FIG. 8b, or 16 according to FIG. 1, the desired value for the exhaust air motor is calculated in dependence on the outside temperature in the $P_{DIFF\ SOLL}$ value calculating controller 710, in which operation this desired value forms a room excess pressure $P_{DIFF\ SOLL}$ established in respect to the outside pressure $P_A$ in dependence on the outside temperature. The desired value $P_{AB\ SOLL}$ can also be determined in dependence on the supply air temperature and/or on the supply air pressure.

Figure 8C:
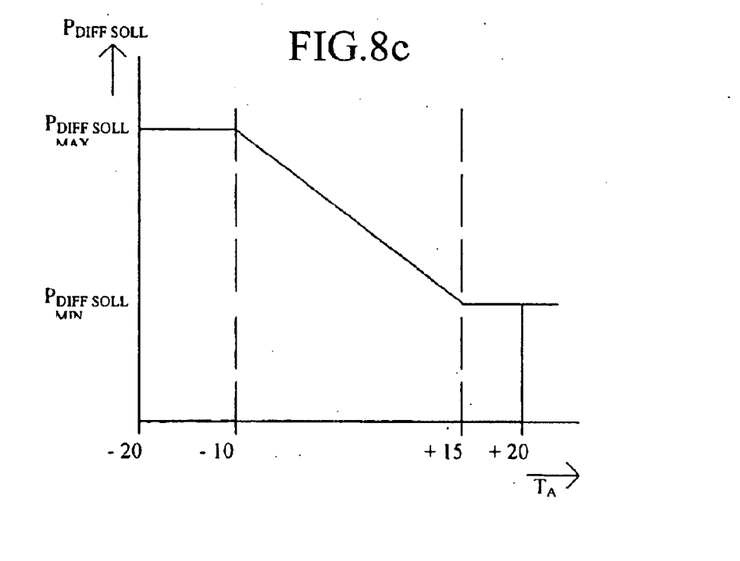
FIG. 8c shows the relation between the desired value of the room difference pressure for the regulator of the exhaust air motor.

The relation between the outside temperature $T_A$ and the desired value for the exhaust air motor gives the desired value for the room excess pressure $P_{DIFF\ SOLL}$, which is represented in FIG. 8c. If the outside temperature $T_A$ exceeds a certain limit value, for example an outside temperature of −10° C., the desired value $P_{DIFF\ SOLL}$ of the exhaust air motor falls with rising outside temperature from its maximum $P_{DIFF\ SOLL\ MAX}$ to its minimum $P_{DIFF\ SOLL\ MIN}$ with a further limit value, for example with an outside temperature of +15° C. At an outside temperature before or after this temperature range established by the two limit values, the desired value of the exhaust air motor $P_{DIFF\ SOLL}$ corresponds either to the maximal room difference pressure $D_{DIFF\ SOLL\ MAX}$ or to the minimal room difference pressure $P_{DIFF\ SOLL\ MIN}$.

The desired value of the exhaust air motor $P_{DIFF\ SOLL}$ determined by the value calculating controller 710 in FIG. 8a is compared in the block circuit diagram element 700 with the actual room pressure difference value $P_{DIFF\ IST}$ in one room and in several rooms with the supply air and exhaust air channel pressure differential. The pressure difference ΔP is fed to the pressure regulation system 730.

The complete pressure regulating circuit is presented in FIG. 8b. The regulating difference $\Delta P_{DIFF}$ is fed to the regulator 740, which adjusts the setting value $Y_{P\ DIFF}$. If in a large room, several windows are open, the exhaust fan can be shut off entirely-only in this way is it possible to maintain a slight excess pressure. With the setting value $Y_{P\ DIFF}$ of the regulator 740, the exhaust air motor 785 in FIG. 8b, or 16 in FIG. 1 which generates the pressure is controlled by the regulating controller 786.

The actual value for the regulator 740 of the exhaust air motor 16 or 785 is formed by the actual room difference pressure $P_{DIFF\ IST}$, which is yielded from the difference between the outside pressure $P_A$ and the room pressure $P_{RAUM\ IST} = P_{AB\ IST}$ The room difference pressure $P_{DIFF\ IST}$ is measured there at a level above 0 (sea level).

The form of execution described can be used analogously for the cooling.

In an additional regulating circuit, the air humidity in the air-conditioned rooms is regulated. It is measured preferably as relative air moisture (in percent of the vapor pressure at full saturation) and expressed by a simplified designation F in the following. It is entirely possible, however, to use instead of the relative humidity, the absolute humidity (g of water vapor per m³ of air), the vapor pressure, the specific moisture (in g $H_2O$ per kg of moist air) or as mixture ratio (in g $H_2O$ per kg of dry air). With use of the relative humidity, the dependence on the saturation limit is advantageously integrated into the value. According to the VDI ventilation rules, air humidity should amount in winter, at 20° C. room temperature, to 35% to 70% relative air humidity, and, in summer, at 22° C. air temperature, to 70%, and at 25° C., to 60%.

In the block circuit element 600 in FIG. 1, there is determined the difference between the desired air moisture $F_{AB\ SOLL}$ and actual air moisture $F_{AB\ IST}$, in which representationally for the air moisture in the individual rooms in the example of execution, the moisture of the exhaust air $F_{AB}$ is measured and adjusted. The determined moisture difference $\Delta F_{AB}$ is first introduced into a limit value circuit device 610, which on the basis of predetermined minimal and maximal moisture $F_{AB\ MIN}$ and $F_{AB\ MIN}$ in dependence on the supply and exhaust air temperature, prevents the saturation limit from being exceeded in any place in the air circulation. From this limit value switching device 610, a corrected regulating difference $\Delta F_{AB}$, is now fed to the regulator 620, which controls the air moistener 630 over the control signal $Y_L$. Thereby, the moisture of the supply air $F_{ZU}$ is adjusted. The regulating controller is represented by the block circuit diagram element 640.

Figure 9:
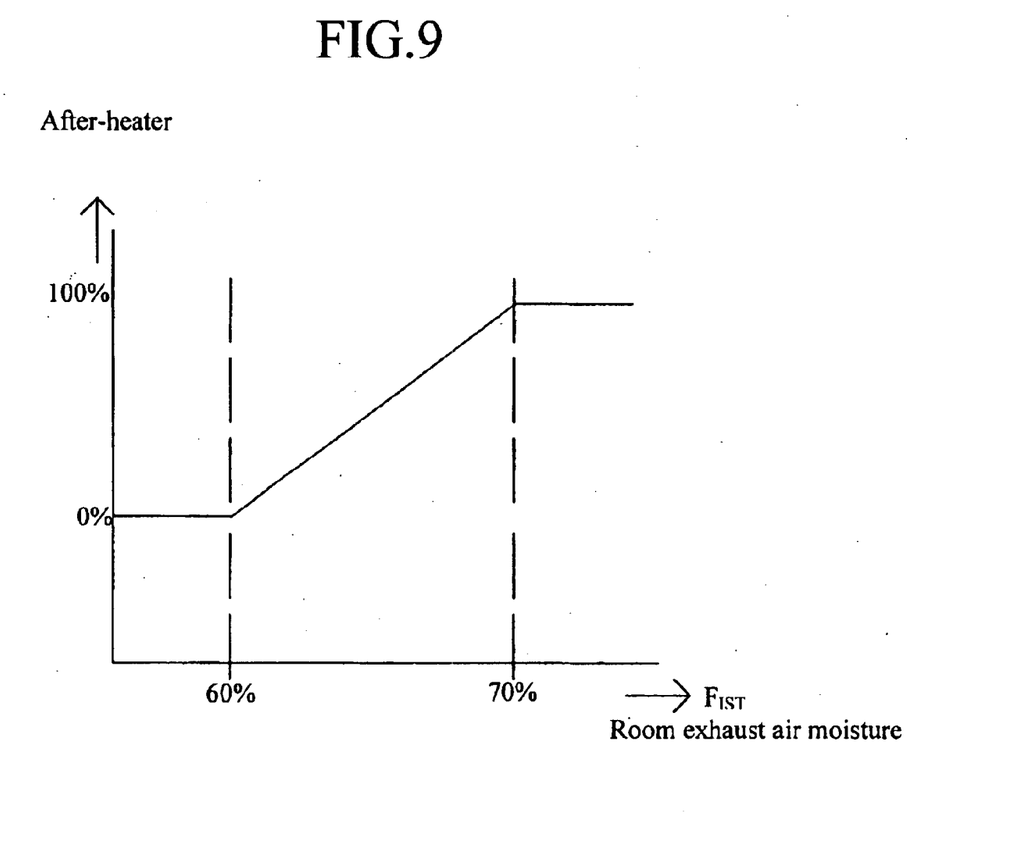
FIG. 9 shows the relation between the room exhaust air moisture and the setting value for the after-heater.

The second heating device 33, in the heating case, may also contain the signal Y' of the first heating device 30. The second heating device (33) serves, however, as an afterheater essentially for the dehumidifying. This second heating device (33) is regulated in dependence on the actual moisture value $F_{IST}$ for the desired moisture value, in which with rising actual moisture value $F_{IST}$ over the desired moisture value $F_{SOLL}$ the heating performance of the second heating device (33) rises. The rise of the heating performance of the second heating device (33) moves over a predetermined moisture range of the room moisture $F_{IST}$ This relation is represented in FIG. 9. At a room moisture $F_{IST}$ before this moisture range, the second heating device (33) is not in operation.

At a room moisture value $F_{IST}$ above this moisture range, the second heating device (33)—the after-heater—is in operation with its maximal performance.

By a control arrangement (not represented here) it is made certain that the conveyance volume of the supply air is not increased during the dehumidifying process and that only a minimum amount of fresh air is blown in.

Figure 10:
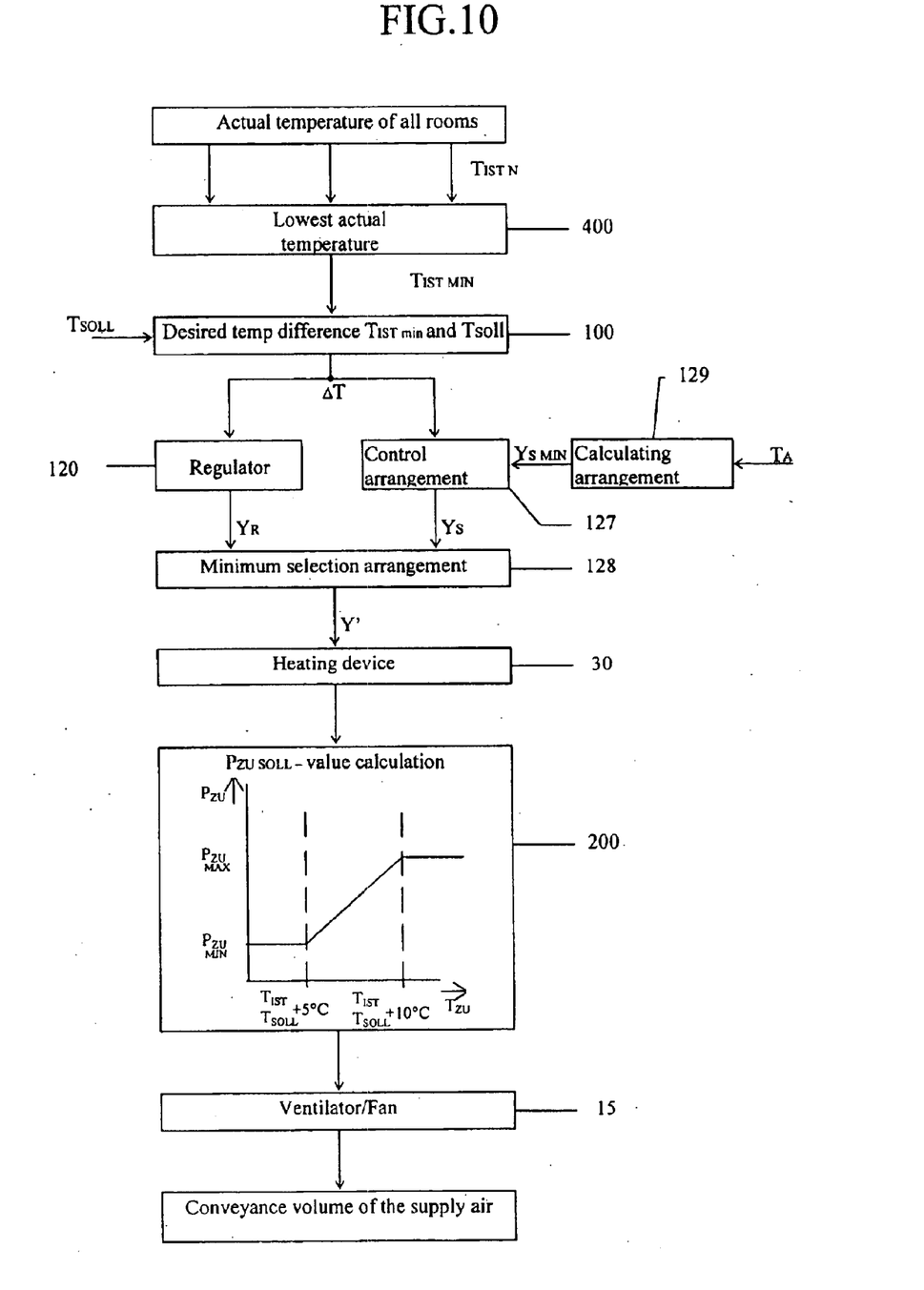
FIG. 10 is a runoff diagram with the most important block circuit diagram elements participating in the heating-up process.

For a better illustration of the regulating system, in the following there is described, by way of example, a warming-up process such as ordinarily takes place in the morning. The block circuit diagram elements participating in the runoff of the regulation are represented in FIG. 10. At the time point when the switching-on of the air-conditioning apparatus takes place, the actual temperatures of all the rooms 1 and the temperature of the drawn-in fresh air lie far above the desired temperature for the rooms 1. Since the temperature of the supply air is still very low, no more supply air is blown into the rooms. For this, a minimal air pressure $P_{ZU\ MIN}$, corresponding to the minimum of fresh air volume, is generated.

At a lower outside temperature below 16° C., the regulator is prior-occupied at the start with a value according to the outside temperature, so that the installation will show no frost disturbance when starting.

From the actual temperatures of all the rooms 1 to be air-conditioned, the minimum-selection controller 400 selects the lowest value and conducts this to the block circuit diagram element 100. Here the regulating difference $\Delta T$ between the desired and actual value of the room air temperatures is formed and supplied to the regulator 120 and the controller 127. On the basis of the regulating difference $\Delta T$, the regulator 120 determines a setting value $Y_R$. Simultaneously with the controller 127, a setting value $Y_S$ is determined, which takes on a maximally great value as long as the desired temperature lies above the actual temperature. Of the two setting values $Y_S$ and $Y_R$, the selection controller 128 selects the smaller one, at this time point the setting value $Y_R$ of the regulator 120, and conducts it onward to the heating device (30). This warms up the air flowing through the air supply channel (10). Therewith, the air supply temperature $T_{ZU}$ rises continuously. From a predetermined temperature threshold value of the air supply, for example $T_{ZU\ SOLL}$ +5° C., with further rising air supply temperature, the air supply pressure also is increased, since the regulation of the air supply pressure occurs in dependence on the temperature of the air supply. The conveyance volume increases and there takes place a maximally rapid heating-up of all the rooms.

The increased air volume consists not only of fresh air, but a part of the exhaust air again is conducted to the supply air through the environmental air channel 12 in FIG. 1. In this manner, the rooms 1 are sufficiently ventilated and, simultaneously, it is not necessary to heat up much fresh air needlessly.

In the morning heating-up, the fresh air constituent is only—at least—such that the requisite excess pressure is achieved.

When the heating-up process is concluded, usual commercial regulators do not lower the setting value rapidly enough to prevent a rise of the actual temperatures of the rooms I over the desired temperature. For this reason the setting value $Y_S$ of the controller 127 on exceeding of the desired temperature falls to a predetermined minimal value $Y_{S\ MIN}$. Now the minimum selection controller 128 selects the value $Y_S$ of the controller 127 and passes it onward as y' to the heating device 30. Thereupon the air supply temperature again falls, and after a short time the rooms again receive only the minimum fresh air volume that is sufficiently tempered to prevent a lowering of the actual temperature of the air supply below the desired temperature of the air supply. The regulator can therefore slowly reduce its output.

Now there is to be described in addition the case in which only one room has to be heated, while the other rooms have already reached the desired temperature. The selection controller 400 selects the lowest actual temperature of the unheated rooms and passes it on to the block circuit diagram element 100. On the basis of the regulating difference now a setting value y' is set in and the supply air pressure rises correspondingly. So that the rooms will not be supplied with very warm supply air which have already reached the desired temperature, however, the individual room temperature regulation systems 300 regulates the blow-in air volume of the throttle valves 60, 61 for each room separately. In this manner the throttle valves 60, 61 of the rooms in which the actual temperature are closed to the minimum opening, which ensures that the rooms are sufficiently ventilated. Simultaneously, the throttle valves 60, 61 of the room being heated rising $T_{ZU}$ is opened up by the $P_{DIFF}$, up to 100%, in order to make possible a rapid heating-up. Only when this room has reached its desired temperature does the air-conditioning regulation again set in the minimum ventilation and desired temperature holding state.

It will be apparent to those skilled in the art that various modifications and variations can be made in the air-conditioning apparatus of the present invention without deviating from the spirit or scope of the invention. Thus, it is intended that the present invention cover the modifications and variations of this inventions provided they come within the scope of the appended claims and their equivalents.

What is claimed is:

1. An air-conditioning apparatus for controlling a temperature condition in at least one room to achieve a selected room temperature condition by ventilation using temperature adjusted supply air comprising:
   a supply air motor for supplying air at a supply air pressure through a supply air channel to the at least one room;
   cooling-heating means for adjusting a temperature of the supply air;
   means for regulating the temperature of the supply air as a function of the difference between the room temperature and the selected room temperature;
   means for regulating a pressure in the at least one room, the pressure being adjustably varied relative to an outside pressure to vary the room pressure in correspondence to the selected room temperature, the pressure regulated in the at least one room as a function of the supply air temperature.

2. The air-conditioning apparatus of claim 1 further comprising a control arrangement for controlling the cooling-heating means to adjust the temperature of the supply air.

3. The air-conditioning apparatus of claim 1 wherein the pressure regulating means further regulates the room pressure relative to an outside air temperature.

4. The air-conditioning apparatus of claim 1 wherein the pressure regulating means regulates the room pressure by adjusting the supply air motor to alter the supply air pressure.

5. The air-conditioning apparatus of claim 1 further comprising a control valve disposed in the supply air channel and wherein the pressure regulating means regulates the room pressure by adjusting the control valve.

6. The air-conditioning apparatus of claim 1 wherein the pressure regulating means regulates room pressure by setting the supply air motor to supply a selected supply air pressure.

7. The air-conditioning apparatus of claim 1 further comprising an exhaust air motor to withdraw air from the at least one room through an exhaust air channel.

8. The air-conditioning apparatus of claim 7 further comprising means for regulating an amount of exhaust air withdrawn from the at least one room.

9. The air-conditioning apparatus of claim 7 wherein the pressure regulating means regulates the room pressure by setting the supply air motor to supply a selected supply air pressure and by setting the exhaust air motor to withdraw a selected amount of exhaust air from the at least one room.

10. The air-conditioning apparatus of claim 7 wherein the pressure regulating means regulates the room pressure by adjusting the exhaust air motor, to adjust an amount of air withdrawn from the room through the exhaust air channel.

11. The air-conditioning apparatus of claim 8 wherein the pressure regulating means adjusts the room pressure by adjusting the exhaust air regulating means to control the amount of exhaust air withdrawn from the room.

12. The air-conditioning apparatus of claim 7 wherein the room pressure is a measured difference between a value of the supply air pressure and a value of an exhaust air pressure.

13. The air-conditioning apparatus of claim 1 wherein the pressure regulating means effects a change in room pressure only when an outside temperature changes within a predetermined temperature range, and when the outside temperature is lower than the predetermined temperature range, the pressure regulating means effects a room pressure having a first constant value, and when the outside temperature is higher than the predetermined temperature range, the regulating means effects a room pressure having a second constant value.

14. The air-conditioning apparatus of claim 13 wherein the pressure regulating means decreases the room pressure from a selected maximum room pressure to a selected minimum room pressure relative to an increase of the outside temperature within the predetermined temperature range.

* * * * *